US012585131B2

(12) United States Patent　(10) Patent No.:　US 12,585,131 B2
Petrell et al.　(45) Date of Patent:　Mar. 24, 2026

---

(54) HYBRID MOTION STABILISATION FOR AUGMENTED REALITY DISPLAYS

(71) Applicant: Distance Technologies Oy, Helsinki (FI)

(72) Inventors: Joona Petrell, Tampere (FI); Mikko Strandborg, Hangonkylä (FI); Thomas Carlsson, Vantaa (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/169,144

(22) Filed: Apr. 3, 2025

(65) Prior Publication Data

US 2025/0314897 A1　Oct. 9, 2025

Related U.S. Application Data

(63) Continuation-in-part of application No. 18/630,154, filed on Apr. 9, 2024, now Pat. No. 12,326,969.

(51) Int. Cl.
　G02B 27/01　(2006.01)
　G02B 3/14　(2006.01)
　G02B 5/09　(2006.01)
(52) U.S. Cl.
　CPC .. G02B 27/0179 (2013.01); *G02B 2027/0183* (2013.01); *G02B 2027/0187* (2013.01)
(58) Field of Classification Search
　CPC ........ G02B 27/0179; G02B 2027/0183; G02B 2027/0187

(Continued)

(56) References Cited

U.S. PATENT DOCUMENTS 9,459,692 B1　10/2016　Li
2004/0080467 A1　4/2004　Chinthammit et al.
(Continued)

FOREIGN PATENT DOCUMENTS

CN　114201038 A　3/2022
JP　2020131882 A　8/2020
KR　20160149252 A　12/2016

OTHER PUBLICATIONS

An et al., "A Real-Time Three-Dimensional Tracking and Registration Method in the AR-HUD System", IEEE Access, vol. 6, Aug. 28, 2018, DOI: 10.1109/ACCESS.2018.2864224, 9 pages.
(Continued)

*Primary Examiner* — Bumsuk Won
*Assistant Examiner* — Grant A Gagnon
(74) *Attorney, Agent, or Firm* — Ziegler IP Law Group, LLC.

(57)　ABSTRACT

When a relative position of a given eye with respect to an optical combiner changes by more than a predefined threshold at least a predefined number of times over a predefined time period, then for a subsequent time period, a three-dimensional (3D) view frustum corresponding to the given eye is updated, in response to the changes in the relative position of the given eye. A spatial anchor is maintained at a predefined position within the 3D view frustum. Corresponding positions for a graphical element are determined in images to be presented to the given eye, based on the predefined position of the spatial anchor within the 3D view frustum. The images are generated for presenting the graphical element to the given eye, positioning the graphical element at the corresponding positions.

16 Claims, 4 Drawing Sheets

(58) Field of Classification Search
USPC ........................................................ 359/630
See application file for complete search history.

(56) References Cited

U.S. PATENT DOCUMENTS

| | | | | |
|---|---|---|---|---|
| 2009/0005961 | A1 | 1/2009 | Grabowski et al. | |
| 2016/0049013 | A1* | 2/2016 | Tosas Bautista ........ | G06F 3/012 |
| | | | | 345/633 |
| 2018/0003972 | A1* | 1/2018 | Kress ................. | G02B 27/0172 |
| 2018/0101986 | A1 | 4/2018 | Burns et al. | |
| 2020/0004328 | A1 | 1/2020 | Blume et al. | |
| 2020/0128231 | A1* | 4/2020 | Pace .................... | H04N 13/383 |
| 2021/0051315 | A1* | 2/2021 | Shamir ................... | G06T 7/571 |
| 2021/0300183 | A1* | 9/2021 | Kondo ................ | B60K 35/211 |
| 2023/0026638 | A1* | 1/2023 | Schoen .................. | G06F 3/011 |
| 2023/0273673 | A1* | 8/2023 | Gompertz ........... | H04R 1/1091 |
| | | | | 341/20 |
| 2024/0087491 | A1* | 3/2024 | Jiang ...................... | B60K 35/81 |
| 2024/0094809 | A1* | 3/2024 | Zhang .................. | G06V 10/145 |
| 2024/0385436 | A1* | 11/2024 | Dehkordi ............... | G06F 3/012 |

OTHER PUBLICATIONS

Azuma et al., "Improving Static and Dynamic Registration in an Optical See-through HMD" Siggraph Conference Proceedings, Jan. 1, 1994, 17 pages.
European Patent Office, Extended European Search Report, Application No. 25165824.1, mailed Aug. 13, 2025, 5 pages.
European Patent Office, Partial European Search Report, Application No. 25168784.4, mailed Aug. 18, 2025, 13 pages.
Lee et al. "Optical design of automotive augmented reality 3D head-up display with light-field rendering" Proceedings of the Spie, Spie, US, vol. 11708, Mar. 5, 2021, ISSN: 0277-786X, DOI: 10.1117/12.2576660, ISBN 978-1-5106-5738-0, 14 pages.
European Patent Office, Extended European Search Report, Application No. 25168784.4, mailed Nov. 19, 2025, 13 pages.

* cited by examiner

HYBRID MOTION STABILISATION FOR AUGMENTED REALITY DISPLAYS

CROSS-REFERENCE TO RELATED APPLICATIONS

This application is a continuation-in-part of U.S. patent application Ser. No. 18/630,154, titled "IMPROVING TRACKING ACCURACY WITH HEAD POSE PREDICTION" and filed on Apr. 9, 2024, which is incorporated herein by reference.

TECHNICAL FIELD

The present disclosure relates to augmented reality (AR) systems; and more particularly, to AR systems and methods for stabilising virtual content in the presence of sudden motion, for example, during shaking or vibrations experienced in moving vehicles.

BACKGROUND

In many augmented reality applications, graphical elements (namely, virtual objects) are rendered to appear anchored to real-world objects in a real-world environment. This anchoring, often referred to as world-locking, allows the graphical elements to maintain a consistent spatial location relative to the physical world. Such techniques are common in automotive heads-up displays (HUDs), aviation HUDs, and other AR systems that present critical information superimposed on a user's field of view.

However, in mobile environments, such as when a vehicle travels over rough terrain or an aircraft experiences turbulence, sudden external accelerations can induce unintended movements of the user's head and eyes. These unintended movements lead to motion artifacts that are particularly problematic for AR systems employing optical combiners, where the graphical elements must remain visually coherent with the physical world.

Although the human visual system includes compensatory mechanisms such as the vestibulo-ocular reflex (VOR), which stabilises gaze during head movement, such biological responses are insufficient for high-frequency or unpredictable motion. In practice, shaking can cause the graphical elements (for example, virtual indicators, gauges, or navigation cues) to become unreadable or difficult to interact with.

Moreover, motion-induced instability not only affects passive viewing but also impairs user interaction with the graphical elements. Techniques such as eye-tracking, hand-tracking, or other input modalities become less reliable when the user's head or the display itself is subject to rapid vibrations. In such scenarios, targeting or manipulating graphical elements can become difficult or error-prone. Additionally, while world-locking techniques aim to match the spatial stability of physical instrumentation, they cannot exceed that baseline.

Conventional approaches attempt to minimize motion-induced blur by improving optical characteristics and temporal characteristics of the display hardware. For example, some liquid crystal display (LCD) devices employ strobed backlighting to reduce motion blur. While such methods can improve readability to some extent, they are fundamentally limited because the graphical elements remain spatially fixed with respect to the physical world, without adapting to the sudden motion of the user's head and/or the AR display itself.

Furthermore, in some conventional AR systems, anchoring the graphical elements to optical infinity reduces relative parallax and can partially mitigate shaking effects. However, such mitigation of the shaking effects is achieved at the cost of being unable to associate the graphical elements with specific near-field real-world objects (for example, dashboards or windshields of vehicles). As a result, the conventional AR systems fail to maintain legibility and usability of the graphical elements during motion.

Therefore, there remains a need for an AR system that can overcome the aforementioned drawbacks.

SUMMARY

The present disclosure seeks to provide an augmented reality (AR) system and method for stabilising graphical elements presented during sudden motion, so as to improve readability and interaction reliability for user(s) in moving vehicles. The aim of the present disclosure is achieved by an AR system and method which incorporate hybrid anchoring of graphical elements, using dynamic pose analysis of the user's eye(s), as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
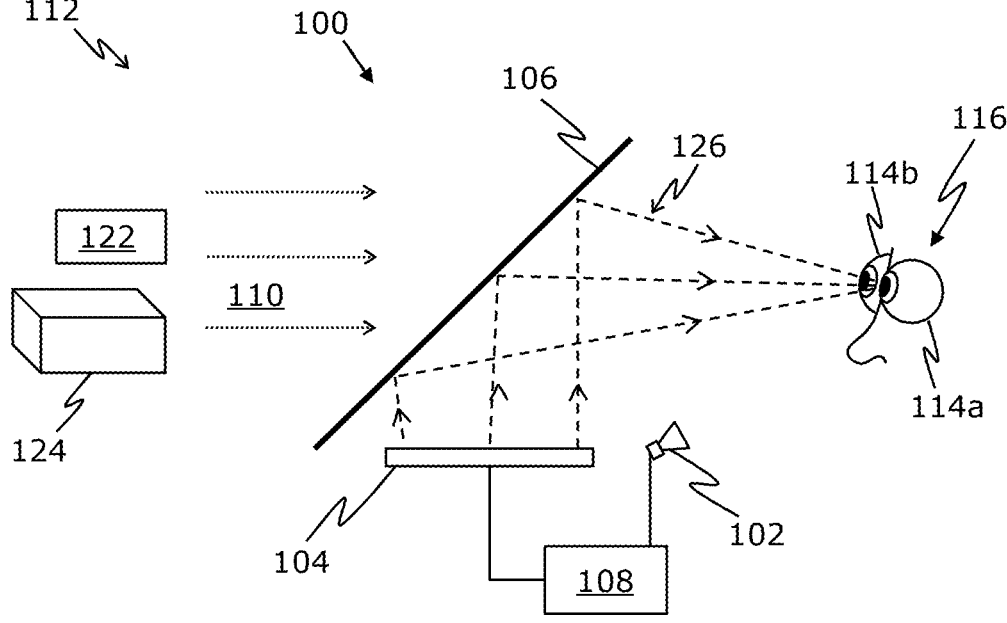
FIG. 1A is a schematic diagram of an augmented reality (AR) system for stabilising graphical elements presented during sudden motion, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an augmented reality (AR) system comprising:
- a tracker;
- a display;
- an optical combiner arranged on an optical path of the display; and
- at least one processor configured to:
  - determine a relative position of a given eye of at least one user with respect to the optical combiner, using the tracker;

detect, over a predefined time period, whether the relative position of the given eye changes by more than a predefined threshold at least a predefined number of times; and when it is detected that the relative position of the given eye changes by more than the predefined threshold at least the predefined number of times over the predefined time period, then for a subsequent time period:

update a three-dimensional (3D) view frustum corresponding to the given eye, in response to changes in the relative position of the given eye with respect to the optical combiner;

maintain a spatial anchor at a predefined position within the 3D view frustum;

determine corresponding positions for a graphical element in images to be presented to the given eye, based on the predefined position of the spatial anchor within the 3D view frustum; and generate the images for presenting the graphical element to the given eye, positioning the graphical element at the corresponding positions.

In a second aspect, an embodiment of the present disclosure provides a method comprising:

determining a relative position of a given eye of at least one user with respect to an optical combiner, using a tracker, wherein the optical combiner is arranged on an optical path of a display;

detecting, over a predefined time period, whether the relative position of the given eye changes by more than a predefined threshold at least a predefined number of times; and when it is detected that the relative position of the given eye changes by more than the predefined threshold at least the predefined number of times over the predefined time period, then for a subsequent time period:

updating a three-dimensional (3D) view frustum corresponding to the given eye, in response to changes in the relative position of the given eye with respect to the optical combiner;

maintaining a spatial anchor at a predefined position within the 3D view frustum;

determining corresponding positions for a graphical element in images to be presented to the given eye, based on the predefined position of the spatial anchor within the 3D view frustum; and generating the images for presenting the graphical element to the given eye, positioning the graphical element at the corresponding positions.

Pursuant to embodiments of the present disclosure, updating the 3D view frustum (corresponding to the given eye) in response to sudden changes in the relative position of the given eye and maintaining the spatial anchor at the predefined position within this updated 3D view frustum enables the graphical element to be presented at a position that updates with the sudden changes in the relative position of the given eye. This improves visual stability of the graphical element during the sudden changes caused by sudden motion events, for example, such as shaking or vibrations in a moving vehicle. In this regard, maintaining the spatial anchor at the predefined position within the updated 3D view frustum allows the graphical element to be rendered in a way that compensates for motion artifacts, thereby improving the readability and legibility of critical AR content especially during unstable viewing conditions. This contributes to improved operational safety in dynamic environments.

Additionally, the use of the predefined threshold, the predefined number of times (namely, the occurrence count) and the predefined time period ensures that visual stabilisation of graphical elements is triggered only when significant instability is detected consistently, thereby avoiding unnecessary computation and maintaining rendering accuracy during normal operation. The predefined number of times ensures that the AR system detects motion trends rather than random fluctuations. In particular, selectively applying stabilisation of the graphical elements based on motion analysis increases the robustness of the AR system across various platforms (e.g., automotive, aviation), where vibrations and rapid motion are common and unavoidable.

Moreover, the AR system adapts to motion-induced displacements of the given eye in real time, helping the user retain focus on important graphical elements and reducing cognitive strain or fatigue in challenging environments. Furthermore, because the AR system and the method account for the relative positioning of the user's eye with respect to the optical combiner, they ensure that graphical elements are correctly placed in the user's field of view, enhancing the realism and spatial coherence of the AR experience. Most importantly, the AR system and the method enable enhanced readability and interactivity with the graphical elements even beyond what is achievable with physical instrumentation of vehicles.

For illustration purposes only, there will now be described how the aforementioned technical benefits are achieved pursuant to embodiments of the present disclosure. Sudden changes in the relative position of the given eye are detected when the relative position changes by more than the predefined threshold at least the predefined number of times over the predefined time period. In this regard, the predefined threshold may be defined in terms of a linear displacement and/or an angular displacement.

The predefined threshold may lie in a range of 1 millimetre to 15 millimetres for linear displacement. As an example, the predefined threshold may be from 1, 2, or 5 millimetres up to 8, 10, or 15 millimetres for linear displacement.

Additionally or alternatively, the predefined threshold may lie in a range of 1 degree to 10 degrees for angular displacement. As an example, the predefined threshold may be from 1, 2, or 5 degrees up to 5 or 10 degrees for angular displacement.

The predefined time period may lie in a range of 30 milliseconds to 1000 milliseconds; more optionally, in a range of 50 milliseconds to 500 milliseconds. As an example, the predefined time period may be from 30, 50, 100, 200, 300, or 500 milliseconds up to 100, 300, 500, or 1000 milliseconds.

The predefined number of times (namely, the occurrence count) may lie in a range of 10 to 100. As an example, the predefined number of times may be from 10, 15, 20, 25, or 50 up to 15, 20, 25, 40, 50, or 100.

The predefined threshold, the predefined time period and the predefined number of times may be selected based on typical motion characteristics of a vehicle in which the AR system is implemented. For example, in a land vehicle that is expected to traverse a rough terrain, lower values of the predefined threshold (for linear displacement) and shorter time periods may be selected to respond to high-frequency vibrations. Conversely, in smoother environments, higher values of the predefined threshold and longer time periods may be used to avoid unnecessary stabilisation and reduce processing overhead. The combination of these values enables the AR system to robustly distinguish between intentional user movements and sudden, externally-induced motion, thereby triggering stabilisation only when appropriate.

The 3D view frustum corresponding to the given eye is determined based on the relative position of the given eye with respect to the optical combiner. Throughout the present disclosure, the term "3D view frustum" refers to a spatial volume within which graphical elements are rendered for presentation to the given eye. When sudden changes in the relative position of the given eye are detected, the 3D view frustum is updated in response to these sudden changes, and the spatial anchor is maintained at the predefined position within the 3D view frustum.

Optionally, in this regard, the at least one processor is configured to, for a given virtual depth at which the graphical element is to be presented, determine a frustum cross-section of the 3D view frustum at the given virtual depth relative to the given eye, wherein the predefined position lies on the frustum cross-section. As an example, the predefined position may be any one of: a centre of the frustum cross-section, a corner of the frustum cross-section, or a centre of an edge of the frustum cross-section.

Optionally, in such a case, the at least one processor is configured to determine a position for the graphical element on the frustum cross-section relative to the spatial anchor. This allows the graphical element to be positioned relative to the spatial anchor at the given virtual depth. The images are then generated for presenting the graphical element to the given eye, with the graphical element positioned at the corresponding positions within the 3D view frustum. It will be appreciated that these images are consecutive images. As the 3D view frustum represents the field of view of the at least one user, maintaining the spatial anchor at the predefined position within the updated 3D view frustum ensures that the graphical element appears consistently at the same location within the user's field of view, unless the graphical element itself is dynamic and changes its position relative to the field of view.

Notably, such visual stabilisation is performed during a subsequent time period following the detection of sudden changes. The duration of this subsequent time period may extend for as long as the sudden changes continue to be detected. As an example, in a real-world scenario, the subsequent time period may last for several seconds or even tens of seconds, depending on the nature and duration of the external motion events.

Otherwise, when no sudden changes are detected, default operations for generating images may be performed. Optionally, in this regard, the at least one processor is configured to:

when it is detected that the relative position of the given eye does not change by more than the predefined threshold at least the predefined number of times over the predefined time period, determine a relative position of a real-world reference object with respect to the given eye, based on a relative position of the real-world reference object with respect to the optical combiner, and the relative position of the given eye with respect to the optical combiner;

determine the corresponding positions for the graphical element in the images to be presented to the given eye, based on the relative position of the real-world reference object with respect to the given eye; and generate the images for presenting the graphical element to the given eye, positioning the graphical element at the corresponding positions.

This pertains to maintaining world-locked rendering of the graphical element based on a spatial relationship between the given eye and the real-world reference object (that is, the relative position of the real-world reference object with respect to the given eye). In some implementations, the relative position of the real-world reference object with respect to the optical combiner may be pre-known; this may be the case when the real-world reference object is a real-world object (for example, such as a bonnet of the vehicle in which the AR system is implemented) whose position is fixed relative to the optical combiner. In other implementations, the AR system may further comprise a real-world-facing camera, wherein the at least one processor is configured to determine the relative position of the real-world reference object with respect to the optical combiner based on a real-world image of a real-world environment captured by the real-world-facing camera. In such implementations, the real-world reference object could be a real-world object identified in the real-world image (for example, such as a building) whose position is not fixed relative to the optical combiner. Irrespective of the implementation, the relative position of the real-world reference object with respect to the given eye can be determined from the relative position of the real-world reference object with respect to the optical combiner and the relative position of the given eye with respect to the optical combiner.

The corresponding positions for the graphical element in the images to be presented to the given eye are then determined based on the relative position of the real-world reference object with respect to the given eye. The images are then generated with the graphical element positioned at these corresponding positions, thereby maintaining alignment between the graphical element and the real-world reference object as perceived from the given eye. As an example, the graphical element can be shown 20 centimetres above the bonnet of the vehicle.

This allows the AR system to render graphical elements that remain anchored to real-world reference objects during periods of stable viewing conditions, where no sudden motion is detected. By avoiding unnecessary stabilisation computations in such conditions, the AR system reduces processing overhead and improves efficiency.

Additionally, rendering the graphical element based on the relative position of the real-world reference object with respect to the given eye ensures accurate spatial alignment and visual consistency between virtual elements (namely, the graphical element) and physical elements (namely, the real-world reference object). This contributes to a more immersive and natural AR experience, as the graphical elements appear correctly positioned in the user's environment.

Moreover, supporting such default rendering in the absence of sudden motion allows the AR system to operate adaptively, switching between a visual stabilised mode and a world-anchored mode, depending on real-time motion characteristics. This adaptability improves robustness and responsiveness across diverse usage scenarios, such as different vehicle types or terrain conditions.

In some implementations, the aforementioned visual stabilisation may be integrated as part of a rendering pipeline or an AR compositor. For example, the AR compositor may be configured to receive multiple content layers, each anchored to a respective real-world reference object, along with predicted eye poses corresponding to a future timepoint at which a final composited frame is to be presented. In such cases, a delta may be calculated between the predicted eye pose and a running average of recent eye poses (for example, collected over a past time window of 300 to 500 milliseconds), in order to isolate effects of sudden shaking. Other algorithms may be employed to calculate the delta, including high-pass filtering or threshold-based change detection. The calculated delta may then be used to temporarily correct the corresponding positions of the graphical element in the images, such that the graphical element appears to move in tandem with the sudden head movements, before returning to its original world-locked position once the sudden motion ends. This late-stage correction enhances readability during high-frequency motion, while preserving spatial consistency of graphical elements in stable conditions.

Furthermore, the images may comprise a plurality of graphical elements. In such cases, the at least one processor may optionally be configured to selectively apply visual stabilisation only to a subset of the plurality of graphical elements, based on a gaze direction of the given eye. Optionally, in this regard, the at least one processor is configured to:

determine a gaze direction of the given eye, using the tracker; and select the graphical element from amongst the plurality of graphical elements, based on the gaze direction of the given eye.

The selected graphical element (that is, the one currently being observed by the given eye) is then subject to visual stabilisation in accordance with the present disclosure, as described above. Remaining graphical elements may be rendered in a world-locked manner based on their respective positions relative to one or more real-world reference objects in the real-world environment.

This allows the AR system to focus visual stabilisation resources on the graphical element(s) that are most relevant to the user's current visual attention, while allowing non-fixated elements, such as general HUD user interface elements, to remain unaffected by visual stabilisation. In doing so, the AR system preserves spatial realism and environmental continuity for peripheral graphical elements, while still improving readability and interaction reliability for actively viewed graphical elements. It will be appreciated that, in multi-user scenarios, different users may be focusing on different graphical elements, as determined based on the gaze directions of their respective eyes. Performing the aforementioned steps independently for each eye of each user ensures that gaze-contingent visual stabilisation is applied appropriately, based on the individual attention of each user.

Moreover, gaze-contingent stabilisation improves computational efficiency by avoiding unnecessary motion correction for off-gaze graphical elements, and also enhances the overall user experience by dynamically adapting the rendering behaviour based on real-time eye-tracking data.

In some implementations, the AR system further comprises at least one sensor configured to sense a motion of at least one real-world reference object relative to the at least one sensor, wherein the at least one processor is configured to:

detect a stutter in the motion of the at least one real-world reference object relative to the at least one sensor during a given time period; and in response to detecting the stutter, maintain a spatial anchor at a predefined position within the 3D view frustum during the given time period;

determine corresponding positions for a graphical element in images to be presented to the given eye during the given time period, based on the predefined position of the spatial anchor within the 3D view frustum; and generate the images for presenting the graphical element to the given eye, positioning the graphical element at the corresponding positions.

The at least one sensor may include at least one of: an inertial measurement unit (IMU), a triaxial inertial measurement unit (TIMU), an accelerometer, a gyroscope, a magnetometer, or a camera. In the case of the camera, motion may be sensed using object recognition techniques applied across a sequence of images captured by the camera.

The at least one processor may be configured to monitor the sensed motion to detect irregularities, such as the stutter in the motion. Throughout the present disclosure, the term "stutter" refers to an abrupt and short-duration deviation in the motion of the real-world reference object over time. In this context, the term "abrupt" may refer to a change in a velocity or acceleration and/or an orientation of the real-world reference object that exceeds a predefined threshold. As an example, the deviation may involve a linear displacement of 1 millimetre to 15 millimetres and/or an angular displacement of 1 degree to 10 degrees, occurring over a duration in a range of 30 milliseconds to 300 milliseconds. Such deviations are distinct from smooth or continuous motion patterns and are indicative of sudden mechanical disturbances, such as jolts, bumps, or abrupt halts.

When such a stutter is detected during the given time period, visual stabilisation may be initiated for the graphical element. In response to detecting the stutter, the spatial anchor is maintained at predefined position within the 3D view frustum corresponding to the given eye, thereby temporarily stabilising the graphical element relative to the given eye instead of the stuttering real-world reference object.

The corresponding positions for the graphical element are then determined in images to be presented to the given eye, based on the predefined position of the spatial anchor within the 3D view frustum. The images are generated accordingly, with the graphical element presented at the stabilised positions for the duration of the stutter, after which normal world-locked rendering may resume.

This approach provides a complementary mechanism for initiating visual stabilisation in scenarios where sudden motion may not be immediately observable through eye-tracking alone. By monitoring the motion of the real-world reference object directly, the AR system can detect external disturbances, such as impacts, jolts, or abrupt mechanical movements, that could degrade the visual coherence of the graphical elements.

Detecting stutter in the motion of a real-world reference object allows the AR system to pre-emptively trigger stabilisation, improving the readability and perceived stability of the graphical element even before the user's eye position is significantly affected. This results in smoother and more continuous presentation of critical graphical elements during high-frequency or mechanical vibration events.

Additionally, this enhances the robustness of the AR system by incorporating multiple motion cues, both user-centric and world-centric, into the visual stabilisation process. This multimodal approach improves system performance across a broader range of usage environments, including vehicles, aircraft, or industrial machinery subject to unpredictable mechanical disturbances.

Furthermore, optionally, the AR system further comprises at least one sensor configured to sense at least one of: (i) an acceleration of a vehicle in which the augmented reality system is implemented, (ii) an orientation of the vehicle, (iii) the motion of the at least one real-world reference object relative to the at least one sensor, wherein the at least one processor is configured to:

determine a vehicular acceleration signal for a first time period, based on the at least one of: (i) the acceleration of the vehicle, (ii) the orientation of the vehicle, (iii) the motion of the at least one real-world reference object, wherein the vehicular acceleration signal represents changes in the at least one of: the acceleration, the orientation of the vehicle;

apply at least one transformation to the vehicular acceleration signal to generate a head acceleration signal for a second time period, wherein the head acceleration signal represents changes in at least one of: an acceleration, an orientation of a head of the at least one user;

determine an expected head movement of the at least one user, based on the head acceleration signal; and adjust the determined relative position of the given eye of the at least one user, based on the expected head movement.

In this regard, the vehicular acceleration signal indicates a change in a linear motion and/or an angular motion of the vehicle over the first time period. The head acceleration signal represents an expected change in the position and/or orientation of the user's head in response to the change in the linear motion and/or the angular motion of the vehicle. Notably, an amplitude of the head acceleration signal is considerably smaller as compared to an amplitude of the vehicular acceleration signal. This is because the at least one user is assumed to be wearing a seat belt while sitting inside the vehicle. Additionally, suspension settings of the vehicle and a biomechanical structure and musculature of the human body act as a buffer for absorbing and dampening an impact of the vehicular acceleration signal on the head of the at least one user.

Optionally, the first time period lies in a range of 10 milliseconds to 1000 milliseconds; more optionally, in a range of 10 milliseconds to 500 milliseconds; yet more optionally, in a range of 10 milliseconds to 200 milliseconds. In some implementations, the second time period partially overlaps with the first time period. In such implementations, the second time period starts after a start of the first time period, but before the first time period ends, and the second time period ends after the first time period has ended. In other implementations, the second time period does not overlap with the first time period at all. In such implementations, the second time period starts (just) after the first time period has ended. Notably, the second time period is different from the first time period, irrespective of whether it overlaps with the first time period or not. This is because when the vehicle is in motion, any change in the acceleration and/or the orientation of the vehicle highly likely affects (namely, changes) the position and/or the orientation of the head of the at least one user after a certain amount of time has passed. As an example, the head of the at least one user may likely receive an impact of the vehicular acceleration signal after 50 milliseconds.

Throughout the present disclosure, the term "transformation" refers to an operation that is applied to the vehicular acceleration signal to generate the head acceleration signal. This operation may involve using one or more signal processing techniques, for example, such as a filtering technique, a smoothing technique, a scaling technique, or similar. The at least one transformation may include at least one of: a dampening transformation, a phase-shift transformation. The dampening transformation accounts for physiological damping by the user's body and seatbelt. The phase-shift transformation models a delay between the vehicle motion and an onset of the head movement.

Optionally, the at least one transformation is generated based on at least one of:

a simulation model of a user seated inside the vehicle, a biomechanical model representing anatomical parts of a human body.

In this regard, the anatomical parts of the human body include the head, a neck, a spine, and a posterior. These anatomical parts are connected by spring-damper joints. The simulation model and the biomechanical model simulate how the user's head is expected to respond to the sensed vehicle motion. Such simulation models and biomechanical models are well known in automotive and aviation industry.

From the head acceleration signal, an expected head movement (including an expected displacement and/or rotation) is determined, and the tracked relative position of the given eye (namely, the relative position determined using the tracker) is adjusted accordingly. As a result, the relative position of the given eye with respect to the optical combiner is refined based on the expected head movement.

This refined relative position of the given eye is then used to update the 3D view frustum and determine the corresponding positions for graphical elements in images to be presented to the user, as described earlier in connection with the 3D view frustum.

Such a predictive approach allows the AR system to stabilise graphical elements even before perceptible eye movement occurs, thereby minimizing latency and improving continuity in AR presentations during vehicle motion. By leveraging the vehicular acceleration signal and transforming it into the head acceleration signal, the AR system introduces a predictive layer of visual stabilisation that operates proactively rather than reactively. This greatly enhances the user experience in dynamic environments, for example, such as during driving over rough terrain or during aircraft turbulence, where reliance on reactive eye tracking alone is insufficient.

Additionally, employing the simulation model and/or the biomechanical model ensures that the prediction is anatomically and physically realistic, increasing the accuracy of visual stabilisation. For instance, differences in spring-damper response between the seat and the head are accounted for, ensuring the predicted head pose matches real-world biomechanics.

This also enables adaptive tuning, allowing the models to be personalized based on individual users, vehicle type, or environmental conditions (e.g., road type, traffic density, weather). Such flexibility makes the AR system robust across diverse real-world scenarios.

By refining the tracked relative position of the given eye based on predicted head motion, the AR system reduces perceived jitter, improves graphical element alignment, and maintains spatial coherence even during continuous or high-frequency motion. This results in an enhanced AR experience with improved usability, readability, and interaction stability.

In some implementations, determining the expected head movement allows to classify changes in the relative position of the given eye into unintentional disturbances and intentional user movements. For example, machine learning techniques or pattern recognition methods may be employed to distinguish sudden spikes indicative of shaking, stutter, or mechanical vibrations from smoother, continuous trajectories resulting from deliberate head movements. Based on such classification, the AR system may selectively apply visual stabilisation by adjusting the position and/or orientation of the graphical elements in a manner that compensates for the detected disturbances. This enables the AR system to maintain a visually steady and coherent presentation during transient shocks, while preserving responsiveness to voluntary user actions. Such adaptive behaviour improves system robustness in dynamic environments.

Moreover, optionally, the at least one processor is configured to:

determine a relative position of the head with respect to the optical combiner, using the tracker;

determine an expected rotational movement of the head, based on the head acceleration signal; and temporarily adjust the position of the spatial anchor within the 3D view frustum, in response to the expected rotational movement of the head, using the determined relative position of the head as a reference.

This allows a rotation compensation to be applied to the graphical element to improve its visual stability. In particular, the expected rotational movement of the head may include a change in pitch, roll, and/or yaw of the user's head over the second time period. In response to this expected rotational movement, a rotation compensation transformation is applied to the graphical element during image generation. This transformation corrects for the predicted rotation of the user's head, such that the graphical element appears stationary and visually coherent from the user's perspective.

As an example, consider a case where a graphical element is displayed in front of the user. If the user rotates their head to the right, then, unless compensated, the graphical element would appear to drift or shift from its original position. In order for the graphical element to remain consistently visible from the user's new viewing angle, it must rotate in the same direction as the head rotation. That is, when the user's head rotates rightward, the graphical element must also be rotated rightward about the user's head position. This maintains the graphical element's perceived orientation and visibility, as it would in a real-world scenario.

In a practical implementation, such compensation can be achieved by modifying a spatial transform used to render the graphical element relative to the updated 3D view frustum. The graphical element is then positioned and rendered with the applied rotation compensation, so that even if the user's head rotates (as predicted), the graphical element appears stable in both orientation and position.

Applying the rotation compensation based on the expected rotational movement of the head further improves the perceived stability and legibility of graphical elements in motion-intensive environments. It allows the AR system to visually anchor graphical elements in a way that compensates not just for position changes but also for rotational motion of the user's head. This is particularly beneficial in high-dynamic scenarios, such as rough terrain driving or aircraft turbulence, where rapid pitch or yaw movements can lead to angular jitter that would otherwise distort the apparent orientation of graphical elements.

By integrating this compensation before motion is actually perceived, the AR system further enhances the predictive visual stabilisation. This results in greater continuity of visual alignment, maintaining orientation and position of graphical elements as the head moves, even in the absence of perfect real-time tracking.

Additionally, this technique enables low-latency rotational correction without relying solely on high-frequency sampling from the eye tracker or head tracker, thereby reducing computational overhead while improving rendering fidelity. Together with the head-pose prediction mechanism, this results in a highly responsive, smooth, and user-centric AR experience that is robust across a wide range of dynamic environments.

Furthermore, it will be appreciated that the aforementioned embodiments, implementations and optional features pursuant to the present disclosure have been described with reference to the given eye, and can be employed similarly for another eye of the at least one user. This is particularly applicable for stereoscopic viewing by generating separate images for each of a left eye and a right eye of the at least one user. In a case where the at least one user is a plurality of users, the aforementioned embodiments, implementations and optional features can be employed similarly for each eye of each user. However, care needs to be taken that spatial anchors are maintained coherently for both eyes of the same user.

Optionally, in this regard, the at least one processor is configured to:

determine a relative position of another eye of the at least one user with respect to the optical combiner, using the tracker; and when it is detected that the relative position of the given eye changes by more than the predefined threshold at least the predefined number of times over the predefined time period, then for the subsequent time period:

update another 3D view frustum corresponding to the another eye, in response to changes in the relative position of the another eye with respect to the optical combiner;

maintain another spatial anchor at another predefined position within the another 3D view frustum, wherein a distance between the another spatial anchor for the another eye and the spatial anchor for the given eye remains unchanged;

determine corresponding positions for the graphical element in other images to be presented to the another eye, based on the another predefined position of the another spatial anchor within the another 3D view frustum;

generate the other images for presenting the graphical element to the another eye, positioning the graphical element at the corresponding positions; and generate light field images from the images and the other images, to present the graphical element to the given eye and the another eye, respectively.

Separate images are generated for the given eye and the another eye of the at least one user, positioning the graphical element at the respective positions in each pair of images based on spatial anchors that are positioned coherently relative to each other. The relative position of each eye with respect to the optical combiner is determined, and accordingly, a respective 3D view frustum corresponding to each eye is updated during a time period in which visual stabilisation is triggered. A respective spatial anchor is maintained for each eye at a respective predefined position within the respective 3D view frustum. Importantly, the spatial anchors for the given eye and the another eye are maintained coherently, such that the distance between them remains unchanged for the given virtual depth at which the graphical element is to be presented. This ensures that the graphical element remains perceptually aligned across both eyes, preserving binocular consistency.

For each eye, corresponding positions for the graphical element are determined based on the respective 3D view frustum and the respective spatial anchor, and respective images (for example, a left image and a right image) are generated with the graphical element positioned accordingly. For autostereoscopy, the images (for the given eye) and the other images (for the another eye) are used to generate the light field images, enabling presentation of the graphical element to both the given eye and the another eye with accurate virtual depth and angular information.

In multi-user implementations, the same process may be applied independently to each eye of each user, with care taken to preserve spatial coherence of the graphical elements across both eyes of a single user.

By maintaining the respective spatial anchor at the respective predefined position within the respective 3D view frustum for each eye, whilst keeping the spatial anchors for the two eyes coherent, it is ensured that the graphical element appears spatially consistent and stable during stereoscopic viewing. This enables the graphical element to be perceived as a unified entity in 3D space, reducing visual strain and preventing double vision or misalignment artifacts that could arise from inconsistent per-eye rendering. Additionally, by generating separate images for the given eye and the another eye based on their respective view frustums, the AR system accounts for differences in eye position and viewpoint, supporting realistic binocular disparity that enhances depth perception.

When light field images are generated from the pair of images, additional angular and depth cues can be preserved, enabling presentation on light field displays and other advanced autostereoscopic systems. This contributes to a more immersive and realistic AR experience, especially when rendering graphical elements that appear at varying virtual depths.

Moreover, such a dual-eye coherence approach enables the AR system to support multi-user AR scenarios, while still maintaining individual perceptual accuracy per user. This increases robustness and scalability in scenarios where multiple users may interact with the same AR system from different positions and angles.

Furthermore, optionally, the at least one processor is configured to:

determine whether the given eye or the another eye is a dominant eye of the at least one user; and when it is detected that the relative position of the given eye changes by more than the predefined threshold at least the predefined number of times over the predefined time period, then for the subsequent time period, increase at least one of: brightness, contrast, of images presented to the dominant eye.

The dominant eye can be determined using any suitable well-known technique. In some implementations, the dominant eye is determined using the tracker. In other implementations, the dominant eye is determined using a calibration procedure. In yet other implementations, the dominant eye is determined by an optometrist, and information indicative of the dominant eye of the at least one user is pre-stored at a data repository, from where this information can be accessed.

When generating the images and the other images to be presented to the given eye and the another eye, respectively, the graphical element is made more clearly visible in the images corresponding to the dominant eye. Such enhanced presentation of the graphical element in the images for the dominant eye may include one or more of:

increased brightness or contrast of the graphical element in the images for the dominant eye, increased sharpness or resolution of the graphical element in the images for the dominant eye, reduced graphical opacity in images for the non-dominant eye.

This approach ensures that both eyes receive stereoscopically consistent images for 3D perception, while optimizing the visual clarity and perceptual dominance of the graphical element for the user's dominant eye. Enhancing the visibility of the graphical element in the images for the dominant eye improves the perceptual clarity of the graphical element without sacrificing stereoscopic depth or realism. Because the human visual system naturally prioritizes the dominant eye when resolving conflicting input, this enhancement ensures that the user perceives the graphical element with maximum stability and readability under dynamic conditions.

Such dominant-eye optimization can be particularly beneficial in motion-heavy environments (e.g., rough terrain or turbulence due to bad weather), where small inconsistencies between the eyes may lead to reduced clarity or temporary discomfort. By biasing the visual clarity toward the dominant eye, the AR system increases the user's confidence in reading or interacting with the graphical element, especially when quick decisions or interpretation are required.

Additionally, this allows the AR system to maintain stereoscopic presentation for depth cues, while strategically managing rendering resources. Rendering enhancements can be applied asymmetrically, by prioritizing the dominant eye for quality, thereby reducing processing overhead for the non-dominant eye without perceptual compromise. Overall, the dominant-eye enhancement technique improves usability, visual comfort, and rendering efficiency in stereoscopic AR systems.

For illustration purposes only, there will now be described how various components of the AR system can be implemented. The at least one processor controls an overall operation of the AR system, and is communicably coupled to the tracker and the display. Optionally, the at least one processor is implemented as a processor of the display. Alternatively, optionally, the at least one processor is implemented as a processor of a computing device that is communicably coupled to the display. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

Throughout the present disclosure, the term "tracker" refers to specialised equipment for detecting and/or following a position of eyes of a given user. The given user encompasses each individual one of the at least one user. Optionally, the tracker is implemented as at least one tracking camera. The at least one tracking camera may comprise at least one of: at least one visible-light camera, at least one infrared (IR) camera, at least one depth camera. Examples of a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of a depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera, and the at least one depth camera) may be utilised in the tracker. When different types of images captured by the various different types of tracking cameras are utilised, a position of the user's eyes can be determined highly accurately, as results obtained from one type of image can be used to refine results obtained from another type of image. Herein, these different types of images constitute tracking data collected by the tracker, and may be in the form of at least one of: visible-light images, IR images, depth images.

In autostereoscopic implementations, corresponding images to be presented to different eyes of each individual one of the at least one user are generated based on the relative positions of different eyes of the at least one user with respect to the optical combiner. In some implementations, the at least one processor is configured to generate the corresponding images by employing a 3D model of a virtual environment having at least one virtual object (including at least one graphical element). Hereinabove, the term "virtual object" refers to a computer-generated object (namely, a digital object). Examples of the at least one virtual object may include, but are not limited to, a virtual navigation tool, a virtual gadget, a virtual message, a virtual entity, a virtual entertainment media, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the at least one processor is configured to store the 3D model at the data repository that is communicably coupled to the at least one processor. The data repository may be implemented as a memory of the at least one processor, a cloud-based database, or similar. In other implementations, the at least one processor is configured to generate the corresponding images in a form of 2D user interface (UI) elements (including at least one graphical element). A 2D UI element could pertain to, for example, a virtual navigation tool, a virtual gadget, a virtual message, a virtual entity, a virtual entertainment media, a virtual information, or similar.

A light field image may be understood to be a two-dimensional (2D) image comprising a plurality of pixels, wherein a first set of pixels from amongst the plurality of pixels is responsible for generating a first part of a synthetic light field (produced by the display) that corresponds to the given eye, and a second set of pixels from amongst the plurality of pixels is responsible for generating a second part of the synthetic light field that corresponds to the another eye. It will be appreciated that the pixels belonging to the first set are not arranged in a continuous manner across the light field image; similarly, the pixels belonging to the second set are also not arranged in a continuous manner across the light field image. Optionally, the pixels belonging to the first set and the pixels belonging to the second set may be arranged in alternating vertical stripes across a horizontal field of view of the light field image, wherein each vertical stripe comprises one or more lines of pixels. This is because humans perceive depth mainly based on horizontal binocular parallax. Thus, in this way, the light field image would be considerably different as compared to a conventional 2D image that is displayed via conventional 2D displays, because a single light field image would comprise visual information corresponding to the given eye as well as the another eye of the at least one user. Accordingly, the display can be any one of: a hogel-based light field display, a lenticular array based light field display, a parallax-barrier based light field display.

The optical combiner could be implemented as at least one of: a lens, a mirror, a semi-transparent mirror, a semi-transparent film, a semi-transparent flexible membrane, a prism, a beam splitter, an optical waveguide, a polarizer. The optical combiner is arranged on the optical path of a real-world light field of the real-world environment, and is employed to optically combine the synthetic light field produced by the display with the real-world light field. Optionally, a tilt angle of the optical combiner with respect to the display lies in a range of 10 degrees and 75 degrees.

Moreover, the optical combiner can be implemented as at least a part of a windshield or other windows of the vehicle in which the AR system is implemented. By "at least a part", it is meant that the optical combiner can also be implemented as an entirety of the windshield or the other windows. This allows the AR system to be implemented as an HUD in a vehicle, providing real-time overlays of navigational information, user assistance alerts, and AR elements, enhancing user situational awareness without obstructing the user's view.

The present disclosure also relates to the method as described above. Various embodiments and variants disclosed above, with respect to the aforementioned first aspect, apply mutatis mutandis to the method.

Optionally, the method further comprises:
when it is detected that the relative position of the given eye does not change by more than the predefined threshold at least the predefined number of times over the predefined time period,
determining a relative position of a real-world reference object with respect to the given eye, based on a relative position of the real-world reference object with respect to the optical combiner, and the relative position of the given eye with respect to the optical combiner;
determining the corresponding positions for the graphical element in the images to be presented to the given eye, based on the relative position of the real-world reference object with respect to the given eye; and
generating the images for presenting the graphical element to the given eye, positioning the graphical element at the corresponding positions.

This allows to render graphical elements that remain anchored to real-world reference objects during periods of stable viewing conditions, where no sudden motion is detected. Supporting such default rendering in the absence of sudden motion allows to operate adaptively, switching between the visual stabilised mode and the world-anchored mode, depending on real-time motion characteristics. This adaptability improves robustness and responsiveness across diverse usage scenarios, such as different vehicle types or terrain conditions.

Furthermore, the images may comprise a plurality of graphical elements. Optionally, in such cases, the method further comprises:
determining a gaze direction of the given eye, using the tracker; and selecting the graphical element from amongst the plurality of graphical elements, based on the gaze direction of the given eye.

This allows to focus visual stabilisation resources on the graphical element(s) that are most relevant to the user's current visual attention, while allowing non-fixated elements, such as general HUD user interface elements, to remain unaffected by visual stabilisation.

Moreover, optionally, the method further comprises:

sensing a motion of at least one real-world reference object relative to at least one sensor;

detecting a stutter in the motion of the at least one real-world reference object relative to the at least one sensor during a given time period; and in response to detecting the stutter, maintaining a spatial anchor at a predefined position within the 3D view frustum during the given time period;

determining corresponding positions for a graphical element in images to be presented to the given eye during the given time period, based on the predefined position of the spatial anchor within the 3D view frustum; and generating the images for presenting the graphical element to the given eye, positioning the graphical element at the corresponding positions.

This approach provides a complementary mechanism for initiating visual stabilisation in scenarios where sudden motion may not be immediately observable through eye-tracking alone. This results in smoother and more continuous presentation of critical graphical elements during high-frequency or mechanical vibration events.

Furthermore, optionally, the method further comprises:

sensing at least one of: (i) an acceleration of a vehicle in which the display and the optical combiner are implemented, (ii) an orientation of the vehicle, (iii) a motion of at least one real-world reference object relative to at least one sensor;

determining a vehicular acceleration signal for a first time period, based on the at least one of: (i) the acceleration of the vehicle, (ii) the orientation of the vehicle, (iii) the motion of the at least one real-world reference object, wherein the vehicular acceleration signal represents changes in the at least one of: the acceleration, the orientation of the vehicle;

applying at least one transformation to the vehicular acceleration signal to generate a head acceleration signal for a second time period, wherein the head acceleration signal represents changes in at least one of: an acceleration, an orientation of a head of the at least one user;

determining an expected head movement of the at least one user, based on the head acceleration signal; and adjusting the determined relative position of the given eye of the at least one user, based on the expected head movement.

Such a predictive approach allows to stabilise graphical elements even before perceptible eye movement occurs, thereby minimizing latency and improving continuity in AR presentations during vehicle motion.

Additionally, optionally, the method further comprises:

determining a relative position of the head with respect to the optical combiner, using the tracker;

determining an expected rotational movement of the head, based on the head acceleration signal; and temporarily adjusting the position of the spatial anchor within the 3D view frustum, in response to the expected rotational movement of the head, using the determined relative position of the head as a reference.

This allows to visually anchor graphical elements in a way that compensates not just for position changes but also for rotational motion of the user's head. This is particularly beneficial in high-dynamic scenarios, such as rough terrain driving or aircraft turbulence, where rapid pitch or yaw movements can lead to angular jitter that would otherwise distort the apparent orientation of graphical elements.

Moreover, optionally, the method further comprises:

determining a relative position of another eye of the at least one user with respect to the optical combiner, using the tracker; and when it is detected that the relative position of the given eye changes by more than the predefined threshold at least the predefined number of times over the predefined time period, then for the subsequent time period:

updating another 3D view frustum corresponding to the another eye, in response to changes in the relative position of the another eye with respect to the optical combiner;

maintaining another spatial anchor at another predefined position within the another 3D view frustum, wherein a distance between the another spatial anchor for the another eye and the spatial anchor for the given eye remains unchanged;

determining corresponding positions for the graphical element in other images to be presented to the another eye, based on the another predefined position of the another spatial anchor within the another 3D view frustum;

generating the other images for presenting the graphical element to the another eye, positioning the graphical element at the corresponding positions; and generating light field images from the images and the other images, to present the graphical element to the given eye and the another eye, respectively.

By maintaining the respective spatial anchor at the respective predefined position within the respective 3D view frustum for each eye, whilst keeping the spatial anchors for the two eyes coherent, it is ensured that the graphical element appears spatially consistent and stable during stereoscopic viewing. This enables the graphical element to be perceived as a unified entity in 3D space, reducing visual strain and preventing double vision or misalignment artifacts that could arise from inconsistent per-eye rendering.

Furthermore, optionally, the method further comprises:

determining whether the given eye or the another eye is a dominant eye of the at least one user; and when it is detected that the relative position of the given eye changes by more than the predefined threshold at least the predefined number of times over the predefined time period, then for the subsequent time period, increasing at least one of: brightness, contrast, of images presented to the dominant eye.

Such dominant-eye optimization can be particularly beneficial in motion-heavy environments (e.g., rough terrain or turbulence), where small inconsistencies between the eyes may lead to reduced clarity or temporary discomfort. By biasing the visual clarity toward the dominant eye, the method increases the user's confidence in reading or interacting with the graphical element, especially when quick decisions or interpretation are required.

DETAILED DESCRIPTION OF THE DRAWINGS

Figure 1B:
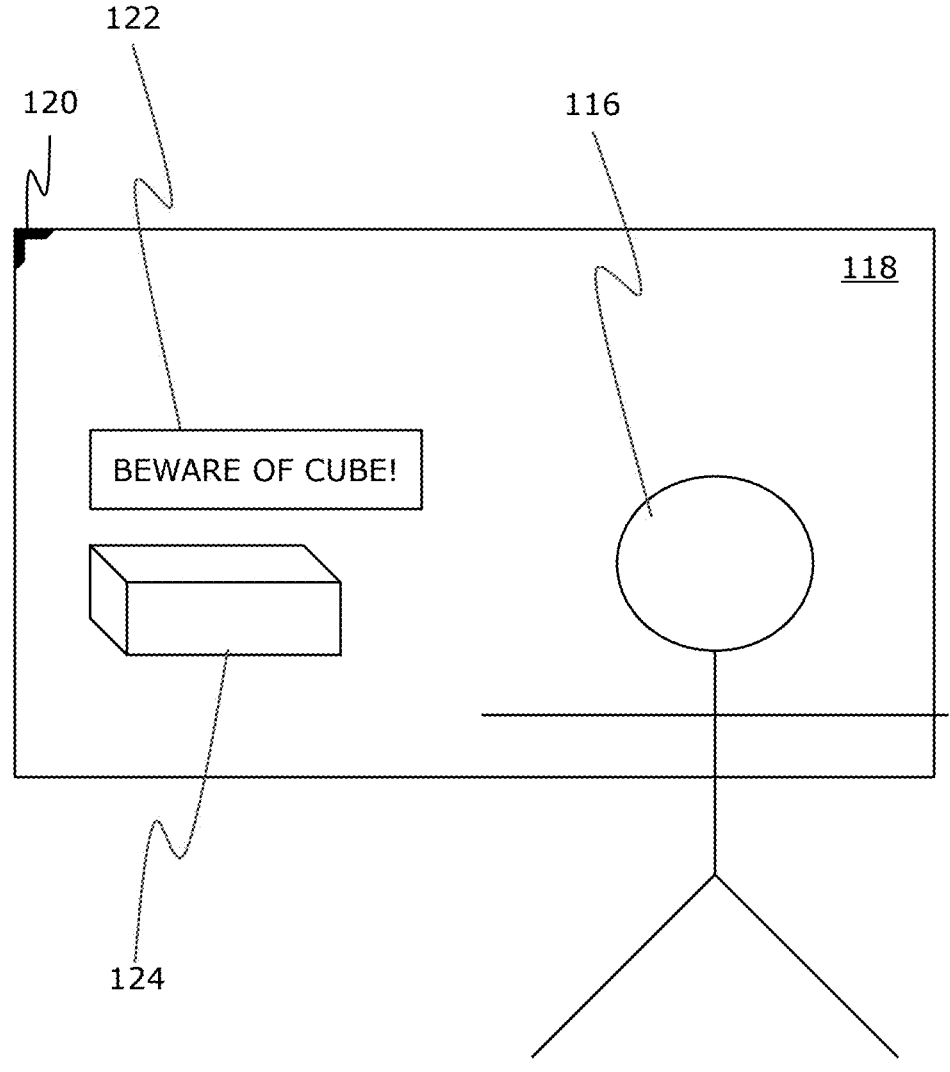
FIGS. 1B and 1C depict how the AR system works, in accordance with an embodiment of the present disclosure.
Figure 1C:
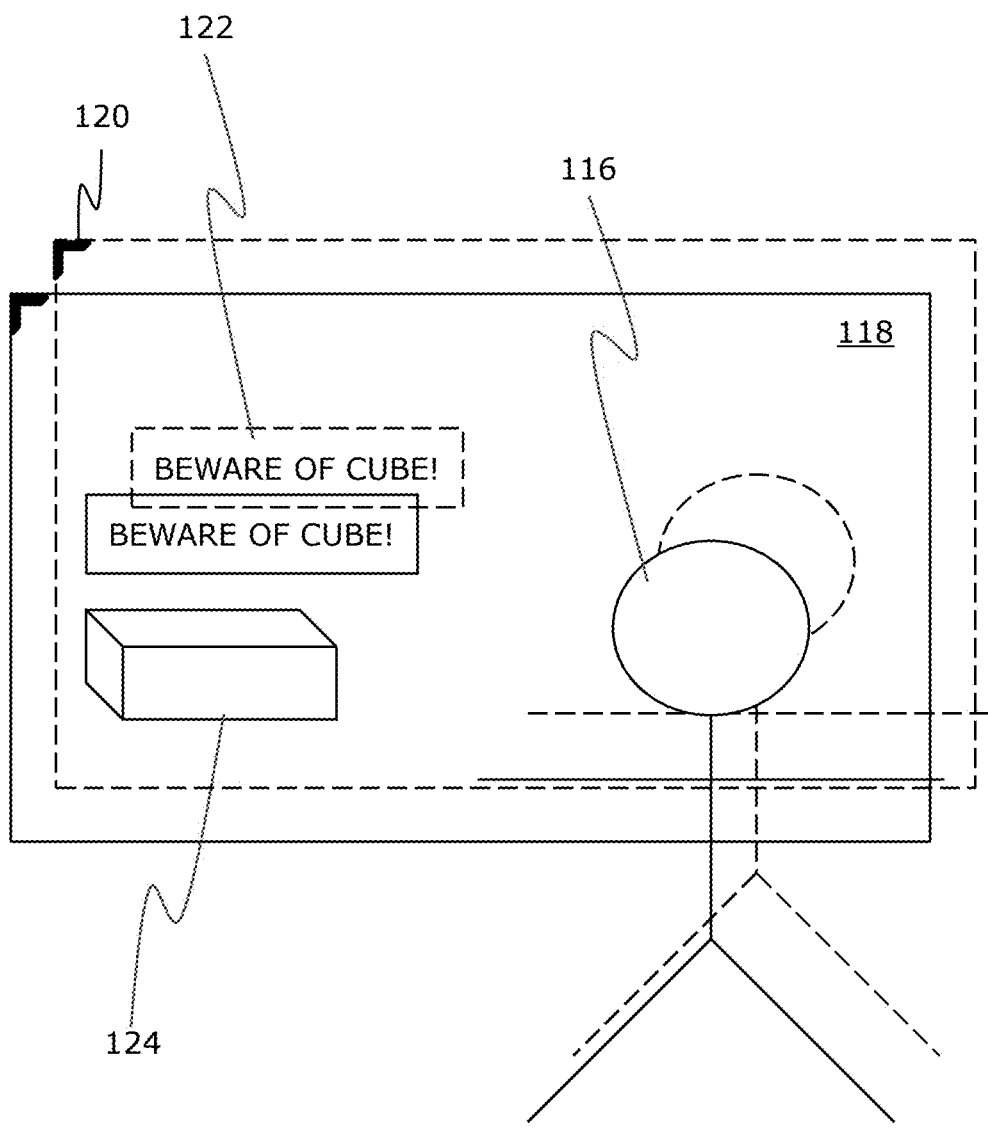

Referring to FIGS. 1A-1C, illustrated are schematic diagrams of an augmented reality (AR) system 100 for stabilising graphical elements presented during sudden motion and how it works, in accordance with an embodiment of the present disclosure. The AR system 100 comprises a tracker 102, a display 104, an optical combiner 106, and at least one processor depicted as a processor 108. The optical combiner 106 is arranged on an optical path of the display 104 and on an optical path of a real-world light field 110 of a real-world environment 112. The processor 108 is configured to:

determine a relative position of a given eye 114a-114b of at least one user 116 with respect to the optical combiner 106, using the tracker 102;

detect, over a predefined time period, whether the relative position of the given eye 114a-114b changes by more than a predefined threshold at least a predefined number of times; and when it is detected that the relative position of the given eye 114a-114b changes by more than the predefined threshold at least the predefined number of times over the predefined time period, then for a subsequent time period:

update a three-dimensional (3D) view frustum 118 corresponding to the given eye 114a-114b, in response to changes in the relative position of the given eye 114a-114b with respect to the optical combiner 106;

maintain a spatial anchor 120 at a predefined position within the 3D view frustum 118;

determine corresponding positions for a graphical element 122 in images to be presented to the given eye 114a-114b, based on the predefined position of the spatial anchor 120 within the 3D view frustum 118; and generate the images for presenting the graphical element 118 to the given eye 114a-114b, positioning the graphical element 118 at the corresponding positions.

In the real-world environment 112, there is at least one real-world object, depicted as a real-world object 124 (shown as a cube, for illustration purposes only). The optical combiner 106 reflects a synthetic light field 126 produced by the display 104 toward the given eye 114a-114b, whilst optically combining it with the real-world light field 110. The synthetic light field 126 presents the graphical element 122 (shown as a box, for illustration purposes only) to the given eye 114a-114b.

FIGS. 1B and 1C depict how the graphical element 122 is positioned at the corresponding positions within the 3D view frustum. For the sake of simplicity, FIGS. 1B and 1C show a frustum cross-section of the 3D view frustum 118 (instead of an entirety of the 3D view frustum), wherein the frustum cross-section is at a given virtual depth at which the graphical element 122 is to be presented from the given eye 114a-114b.

With reference to FIG. 1C, dashed lines are used to depict the following:

a changed relative position of the given eye 114a-114b, the 3D view frustum 118 that is updated according to the changed relative position of the given eye 114a-114b, wherein the spatial anchor 120 is shown to be maintained at the predefined position within the updated 3D view frustum 118, and the graphical element 118 being positioned at a corresponding position relative to the spatial anchor 120.

It may be understood by a person skilled in the art that FIGS. 1A-1C include a simplified example implementation of the AR system 100, for sake of clarity, which should not unduly limit the scope of the claims herein. It is to be understood that the specific implementation of the AR system 100 is not to be construed as limiting it to specific numbers or types of trackers, displays, optical combiners, and processors. A person skilled in the art will recognize many variations, alternatives, and modifications of embodiments of the present disclosure.

Figure 2:
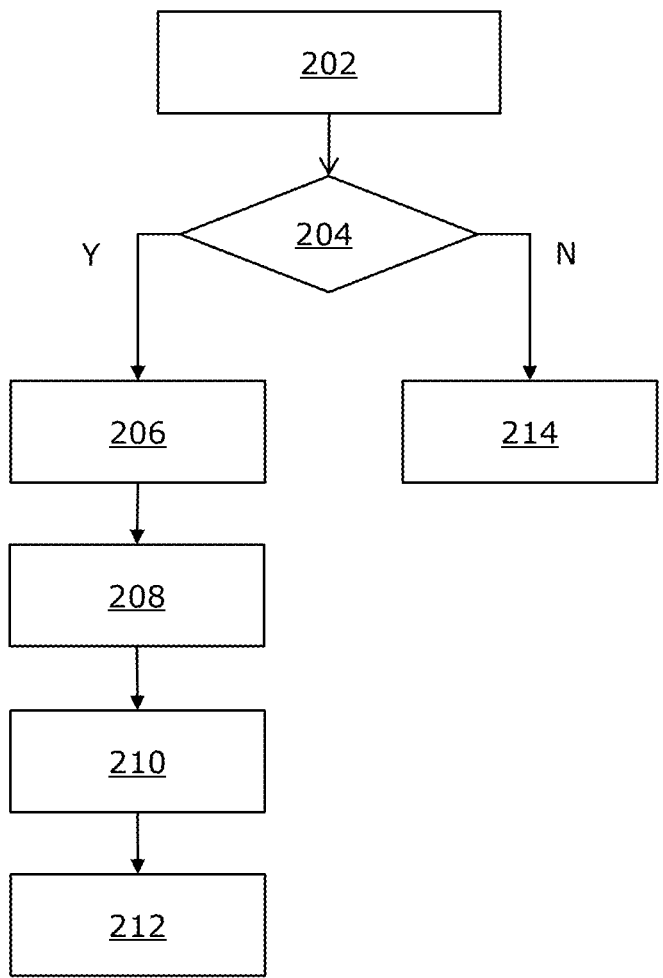
FIG. 2 depicts steps of a method for stabilising graphical elements presented during sudden motion, in accordance with an embodiment of the present disclosure.

Referring to FIG. 2, illustrated are steps of a method for stabilising graphical elements presented during sudden motion, in accordance with an embodiment of the present disclosure. At step 202, a relative position of a given eye of at least one user with respect to an optical combiner is determined, using a tracker. The optical combiner is arranged on an optical path of a display. At step 204, it is detected, over a predefined time period, whether the relative position of the given eye changes by more than a predefined threshold at least a predefined number of times.

When, at step 204, it is detected that the relative position of the given eye changes by more than the predefined threshold at least the predefined number of times over the predefined time period, then for a subsequent time period, steps 206, 208, 210 and 212 are performed. At step 206, a 3D view frustum corresponding to the given eye is updated, in response to changes in the relative position of the given eye with respect to the optical combiner. At step 208, a spatial anchor is maintained at a predefined position within the 3D view frustum. At step 210, corresponding positions are determined for a graphical element in images to be presented to the given eye, based on the predefined position of the spatial anchor within the 3D view frustum. At step 212, the images are generated for presenting the graphical element to the given eye, positioning the graphical element at the corresponding positions.

Otherwise, when, at step 204, it is detected that the relative position of the given eye does not change by more than the predefined threshold at least the predefined number of times over the predefined time period, then step 214 is performed. At step 214, the corresponding positions for the graphical element may be determined, based on a relative position of a real-world reference object with respect to the given eye, and the images may be generated accordingly.

The aforementioned steps are only illustrative and other alternatives can also be provided where one or more steps are added without departing from the scope of the claims herein.

The invention claimed is:

1. An augmented reality system comprising:

a tracker;

a display;

an optical combiner arranged on an optical path of the display; and at least one processor configured to:

determine a relative position of a given eye of at least one user with respect to the optical combiner, using the tracker;

maintain a world-locked rendering of a graphical element based on a spatial relationship between the given eye and a real-world reference object;

detect, over a predefined time period, whether the relative position of the given eye changes by more than a predefined threshold at least a predefined number of times; and when it is detected that the relative position of the given eye changes by more than the predefined threshold at least the predefined number of times over the predefined time period, then for a subsequent time period;

switch between the world-locked rendering and a visual stabilised rendering wherein the at least one processor is configured to:

update a three-dimensional (3D) view frustum corresponding to the given eye, in response to changes in the relative position of the given eye with respect to the optical combiner;

maintain a spatial anchor at a predefined position within the 3D view frustum;

determine corresponding positions for a graphical element in images to be presented to the given eye, based on the predefined position of the spatial anchor within the 3D view frustum; and generate the images for presenting the graphical element to the given eye, positioning the graphical element at the corresponding positions.

2. The augmented reality system of claim 1, wherein the at least one processor is configured to:

when it is detected that the relative position of the given eye does not change by more than the predefined threshold at least the predefined number of times over the predefined time period, determine the relative position of the real-world reference object with respect to the given eye, based on a relative position of the real-world reference object with respect to the optical combiner, and the relative position of the given eye with respect to the optical combiner;

determine the corresponding positions for the graphical element in the images to be presented to the given eye, based on the relative position of the real-world reference object with respect to the given eye; and generate the images for presenting the graphical element to the given eye, positioning the graphical element at the corresponding positions.

3. The augmented reality system of claim 1, further comprising at least one sensor configured to sense a motion of at least one real-world reference object relative to the at least one sensor, wherein the at least one processor is configured to:

detect a stutter in the motion of the at least one real-world reference object relative to the at least one sensor during a given time period; and in response to detecting the stutter, maintain a spatial anchor at a predefined position within the 3D view frustum during the given time period;

determine corresponding positions for a graphical element in images to be presented to the given eye during the given time period, based on the predefined position of the spatial anchor within the 3D view frustum; and generate the images for presenting the graphical element to the given eye, positioning the graphical element at the corresponding positions.

4. The augmented reality system of claim 1, further comprising at least one sensor configured to sense at least one of: (i) an acceleration of a vehicle in which the augmented reality system is implemented, (ii) an orientation of the vehicle, (iii) a motion of at least one real-world reference object relative to the at least one sensor, wherein the at least one processor is configured to:

determine a vehicular acceleration signal for a first time period, based on the at least one of: (i) the acceleration of the vehicle, (ii) the orientation of the vehicle, (iii) the motion of the at least one real-world reference object, wherein the vehicular acceleration signal represents changes in the at least one of: the acceleration, the orientation of the vehicle;

apply at least one transformation to the vehicular acceleration signal to generate a head acceleration signal for a second time period, wherein the head acceleration signal represents changes in at least one of: an acceleration, an orientation of a head of the at least one user;

determine an expected head movement of the at least one user, based on the head acceleration signal; and adjust the determined relative position of the given eye of the at least one user, based on the expected head movement.

5. The augmented reality system of claim 4, wherein the at least one processor is configured to:

determine a relative position of the head with respect to the optical combiner, using the tracker;

determine an expected rotational movement of the head, based on the head acceleration signal; and temporarily adjust the position of the spatial anchor within the 3D view frustum, in response to the expected rotational movement of the head, using the determined relative position of the head as a reference.

6. The augmented reality system of claim 1, wherein the at least one processor is configured to:

determine a relative position of another eye of the at least one user with respect to the optical combiner, using the tracker; and when it is detected that the relative position of the given eye changes by more than the predefined threshold at least the predefined number of times over the predefined time period, then for the subsequent time period:

update another 3D view frustum corresponding to the another eye, in response to changes in the relative position of the another eye with respect to the optical combiner;

maintain another spatial anchor at another predefined position within the another 3D view frustum, wherein a distance between the another spatial anchor for the another eye and the spatial anchor for the given eye remains unchanged;

determine corresponding positions for the graphical element in other images to be presented to the another eye, based on the another predefined position of the another spatial anchor within the another 3D view frustum;

generate the other images for presenting the graphical element to the another eye, positioning the graphical element at the corresponding positions; and generate light field images from the images and the other images, to present the graphical element to the given eye and the another eye, respectively.

7. The augmented reality system of claim 1, wherein the images comprise a plurality of graphical elements, wherein the at least one processor is configured to:

determine a gaze direction of the given eye, using the tracker; and select the graphical element from amongst the plurality of graphical elements, based on the gaze direction of the given eye.

8. The augmented reality system of claim 1, wherein the at least one processor is configured to:

determine whether the given eye or the another eye is a dominant eye of the at least one user; and when it is detected that the relative position of the given eye changes by more than the predefined threshold at least the predefined number of times over the predefined time period, then for the subsequent time period, increase at least one of: brightness, contrast, of images presented to the dominant eye.

9. A method comprising:

determining a relative position of a given eye of at least one user with respect to an optical combiner, using a tracker, wherein the optical combiner is arranged on an optical path of a display;

maintaining a world-locked rendering of a graphical element based on a spatial relationship between the given eye and a real-world reference object;

detecting, over a predefined time period, whether the relative position of the given eye changes by more than a predefined threshold at least a predefined number of times; and when it is detected that the relative position of the given eye changes by more than the predefined threshold at least the predefined number of times over the predefined time period, then for a subsequent time period:

switching between the world-locked rendering and a visual stabilised rendering wherein the at least one processor is configured to:

updating a three-dimensional (3D) view frustum corresponding to the given eye, in response to changes in the relative position of the given eye with respect to the optical combiner;

maintaining a spatial anchor at a predefined position within the 3D view frustum;

determining corresponding positions for a graphical element in images to be presented to the given eye, based on the predefined position of the spatial anchor within the 3D view frustum; and generating the images for presenting the graphical element to the given eye, positioning the graphical element at the corresponding positions.

10. The method of claim 9, further comprising:

when it is detected that the relative position of the given eye does not change by more than the predefined threshold at least the predefined number of times over the predefined time period, determining the relative position of the real-world reference object with respect to the given eye, based on a relative position of the real-world reference object with respect to the optical combiner, and the relative position of the given eye with respect to the optical combiner;

determining the corresponding positions for the graphical element in the images to be presented to the given eye, based on the relative position of the real-world reference object with respect to the given eye; and generating the images for presenting the graphical element to the given eye, positioning the graphical element at the corresponding positions.

11. The method of claim 9, further comprising:

sensing a motion of at least one real-world reference object relative to at least one sensor;

detecting a stutter in the motion of the at least one real-world reference object relative to the at least one sensor during a given time period; and in response to detecting the stutter, maintaining a spatial anchor at a predefined position within the 3D view frustum during the given time period;

determining corresponding positions for a graphical element in images to be presented to the given eye during the given time period, based on the predefined position of the spatial anchor within the 3D view frustum; and generating the images for presenting the graphical element to the given eye, positioning the graphical element at the corresponding positions.

12. The method of claim 9, further comprising:

sensing at least one of: (i) an acceleration of a vehicle in which the display and the optical combiner are implemented, (ii) an orientation of the vehicle, (iii) a motion of at least one real-world reference object relative to at least one sensor;

determining a vehicular acceleration signal for a first time period, based on the at least one of: (i) the acceleration of the vehicle, (ii) the orientation of the vehicle, (iii) the motion of the at least one real-world reference object, wherein the vehicular acceleration signal represents changes in the at least one of: the acceleration, the orientation of the vehicle;

applying at least one transformation to the vehicular acceleration signal to generate a head acceleration signal for a second time period, wherein the head acceleration signal represents changes in at least one of: an acceleration, an orientation of a head of the at least one user;

determining an expected head movement of the at least one user, based on the head acceleration signal; and adjusting the determined relative position of the given eye of the at least one user, based on the expected head movement.

13. The method of claim 12, further comprising:

determining a relative position of the head with respect to the optical combiner, using the tracker;

determining an expected rotational movement of the head, based on the head acceleration signal; and temporarily adjusting the position of the spatial anchor within the 3D view frustum, in response to the expected rotational movement of the head, using the determined relative position of the head as a reference.

14. The method of claim 9, further comprising:

determining a relative position of another eye of the at least one user with respect to the optical combiner, using the tracker; and when it is detected that the relative position of the given eye changes by more than the predefined threshold at least the predefined number of times over the predefined time period, then for the subsequent time period:

updating another 3D view frustum corresponding to the another eye, in response to changes in the relative position of the another eye with respect to the optical combiner;

maintaining another spatial anchor at another predefined position within the another 3D view frustum, wherein a distance between the another spatial anchor for the another eye and the spatial anchor for the given eye remains unchanged;

determining corresponding positions for the graphical element in other images to be presented to the another eye, based on the another predefined position of the another spatial anchor within the another 3D view frustum;

generating the other images for presenting the graphical element to the another eye, positioning the graphical element at the corresponding positions; and generating light field images from the images and the other images, to present the graphical element to the given eye and the another eye, respectively.

15. The method of claim 9, wherein the images comprise a plurality of graphical elements, wherein the method further comprises:

determining a gaze direction of the given eye, using the tracker; and selecting the graphical element from amongst the plurality of graphical elements, based on the gaze direction of the given eye.

16. The method of claim 9, further comprising:

determining whether the given eye or the another eye is a dominant eye of the at least one user; and when it is detected that the relative position of the given eye changes by more than the predefined threshold at least the predefined number of times over the predefined time period, then for the subsequent time period, increasing at least one of: brightness, contrast, of images presented to the dominant eye.

\* \* \* \* \*